(12) United States Patent
Odnovorov et al.

(10) Patent No.: US 9,659,184 B2
(45) Date of Patent: *May 23, 2017

(54) MULTI-IDENTITY GRAPHICAL USER INTERFACE FOR SECURE FILE SHARING

(71) Applicant: nCrypted Cloud LLC, Boston, MA (US)

(72) Inventors: Igor Odnovorov, Walpole, MA (US); Nicholas Stamos, Belmont, MA (US)

(73) Assignee: nCrypted Cloud LLC, Boston, MA (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/689,202

(22) Filed: Apr. 17, 2015

(65) Prior Publication Data

US 2015/0278541 A1 Oct. 1, 2015

Related U.S. Application Data

(63) Continuation of application No. 14/299,768, filed on Jun. 9, 2014, now Pat. No. 9,053,342, which is a (Continued)

(51) Int. Cl.
*H04L 29/06* (2006.01)
*G06F 21/62* (2013.01)
*H04L 9/08* (2006.01)

(52) U.S. Cl.
CPC .......... *G06F 21/6218* (2013.01); *H04L 9/088* (2013.01); *H04L 9/0891* (2013.01);
(Continued)

(58) Field of Classification Search
USPC ......................................................... 726/28
See application file for complete search history.

(56) References Cited

U.S. PATENT DOCUMENTS 5,787,175 A 7/1998 Carter
6,405,315 B1 6/2002 Burns et al.
(Continued)

FOREIGN PATENT DOCUMENTS

WO WO 2008/065343 A1 6/2008

OTHER PUBLICATIONS

Tadayoshi Kohno, "Attacking and repairing the winZip encryption scheme," Proceedings of the 11th ACM Conference on Computer and Communications Security, CCS '04, Jan. 1, 2004, 10 pages.
(Continued)

*Primary Examiner* — Jason Lee
(74) *Attorney, Agent, or Firm* — Cesari and McKenna, LLP

(57) ABSTRACT

In the approaches described herein, a data file storage service may control access to file system objects using corresponding "personal" or organization-related "work" identity information which may include encryption keys or passwords. To assist the user with identifying respective file system objects, the user is presented with a corresponding graphical user interface (GUI) which displays a corresponding personal or work identity icon next to a visual rendering of the file system objects. Keys that control access to work identity files and folders are purged from a local key store as soon as user authorization changes are detected. In this way, even a user who originated a data file will not be able to decrypt files stored in a folder shared using a work identity once that identity is canceled by the organization, while at the same time, the user's access to their personal files may continue.

8 Claims, 7 Drawing Sheets

Related U.S. Application Data continuation of application No. 14/207,856, filed on Mar. 13, 2014, now Pat. No. 9,053,341, application No. 14/689,202, filed on Apr. 17, 2015, which is a continuation of application No. 14/027,441, filed on Sep. 16, 2013, now Pat. No. 9,015,858, which is a continuation of application No. 13/743,051, filed on Jan. 16, 2013, now Pat. No. 8,572,757, which is a continuation of application No. 13/690,800, filed on Nov. 30, 2012, now abandoned.

(60) Provisional application No. 61/778,873, filed on Mar. 13, 2013.

(52) U.S. Cl.
CPC .......... *H04L 9/0894* (2013.01); *H04L 63/065* (2013.01); *H04L 63/102* (2013.01); *G06F 2221/2141* (2013.01); *H04L 63/0428* (2013.01)

(56) References Cited

U.S. PATENT DOCUMENTS

| | | | |
|---|---|---|---|
| 6,697,846 | B1 | 2/2004 | Soltis |
| 7,010,689 | B1 | 3/2006 | Matyas, Jr. et al. |
| 7,058,648 | B1 | 6/2006 | Lightfoot et al. |
| 7,523,317 | B2 | 4/2009 | Oswald et al. |
| 7,614,081 | B2 | 11/2009 | Prohel et al. |
| 7,730,543 | B1 | 6/2010 | Nath |
| 7,849,307 | B2 * | 12/2010 | Roskind ............... G06F 21/316 705/66 |
| 7,908,476 | B2 | 3/2011 | Kandasamy et al. |
| 8,199,911 | B1 | 6/2012 | Tsaur et al. |
| 8,200,964 | B2 | 6/2012 | Perlman et al. |
| 8,572,757 | B1 | 10/2013 | Stamos et al. |
| 2004/0059929 | A1 | 3/2004 | Rodgers et al. |
| 2005/0240773 | A1 | 10/2005 | Hilbert et al. |
| 2007/0150299 | A1 | 6/2007 | Flory |
| 2007/0282757 | A1 | 12/2007 | Pandya et al. |
| 2008/0104393 | A1 | 5/2008 | Glasser et al. |
| 2008/0307486 | A1 | 12/2008 | Ellison et al. |
| 2009/0076865 | A1 | 3/2009 | Rousselle et al. |
| 2009/0254762 | A1 | 10/2009 | Priel et al. |
| 2009/0313079 | A1 | 12/2009 | Wahl |
| 2010/0131589 | A1 | 5/2010 | Lawyer et al. |
| 2010/0198871 | A1 | 8/2010 | Stiegler et al. |
| 2010/0306530 | A1 | 12/2010 | Johnson et al. |
| 2011/0047195 | A1 | 2/2011 | Le et al. |
| 2011/0252071 | A1 | 10/2011 | Cidon |
| 2011/0258426 | A1 | 10/2011 | Mujtaba et al. |
| 2012/0066755 | A1 | 3/2012 | Peddada et al. |
| 2012/0192084 | A1 | 7/2012 | Dura et al. |
| 2012/0323959 | A1 | 12/2012 | O'Sullivan et al. |
| 2013/0080765 | A1 | 3/2013 | Mohanty et al. |
| 2013/0219456 | A1 | 8/2013 | Sharma et al. |
| 2014/0059699 | A1 | 2/2014 | Tewksbary et al. |
| 2014/0130142 | A1 | 5/2014 | Plewnia |

OTHER PUBLICATIONS

International Search Report and Written Opinion mail date Mar. 18, 2014 for International Application No. PCT/US2013/070905 filed on Nov. 20, 2013 by nCrypted Cloud LLC, 13 pages.
BoxCryptor Flyer "BoxCryptor—On-the-fly Encryption for cloud storage" http://www.boxcryptor.com, 3 pages.
"Cloud Encryption" Vormetric flyer, vormetric.com, 1 page.
Cloudfogger "Cloudfogger Download" Flyer, www.cloudfogger.com, 2012, 1 page.
TeamDrive "TeamDrive—sync your files easily and securely . . . " Flyer, www.teamdrive.com, 2012, 2 pages.
Truecrypt, "Truecrypt—Free Open-Source Disk Encryption—Documentation" Flyer, www.truecrypt.org/docs, 1 page.
Windows User Manual, 2012, 31 pages.
CipherCloud flyer "Data Encryption for the cloud" www.ciphercloud.com/cloud-encryption.aspx, 2012, 2 pages.
Kim et al; "Integration of a Cryptographic File System and Access Control;" Intelligence and Securities Informatics Lecture Notes in Computer Science vol. 3917, 2006, pp. 139-151.
International Search Report and Written Opinion mailed Jul. 23, 2014 for International Application No. PCT/US2014/025434 filed Mar. 13, 2014 by nCrypted Cloud LLC, 12 pages.

* cited by examiner

MULTI-IDENTITY GRAPHICAL USER INTERFACE FOR SECURE FILE SHARING

CROSS REFERENCE TO RELATED APPLICATION(S)

This application is a continuation of a U.S. patent application Ser. No. 14/299,768 filed on Jun. 9, 2014 entitled "MULTI-IDENTITY FOR SECURE FILE SHARING" which is a continuation of U.S. patent Ser. No. 14/207,856 filed on Mar. 13, 2014 entitled "MULTI-IDENTITY FOR SECURE FILE SHARING", and claims the benefit of the filing date of a U.S. Provisional Patent Application Ser. No. 61/778,873 filed Mar. 13, 2013 entitled "MULTI-IDENTITY FOR SECURE FILE SHARING", and is also a continuation of U.S. patent application Ser. No. 14/027,441 filed on Sep. 16, 2013 entitled "A GRAPHICAL USER INTERFACE FOR SEAMLESS SECURE PRIVATE COLLABORATION" which is a continuation of commonly assigned U.S. patent application Ser. No. 13/743,051, filed on Jan. 16, 2013 entitled "SEAMLESS SECURE PRIVATE COLLABORATION ACROSS TRUST BOUNDARIES", which is a continuation of commonly assigned U.S. patent application Ser. No. 13/690,800, filed on Nov. 30, 2012 entitled "SEAMLESS SECURE PRIVATE COLLABORATION ACROSS TRUST BOUNDARIES". The entire contents of each of the above-referenced patent applications are hereby incorporated by reference.

BACKGROUND

Technical Field

This application relates to secure, collaborative file sharing across trust boundaries and among different devices and users.

Introduction

It is now quite common for an individual person to use many different types of data processors. Desktop computers and laptops are increasingly augmented and even supplanted by smartphones and tablet computers. Accustomed to using these different client devices to access public information on the World Wide Web, they now find it important to be able to access their own files and private information in the same way. Solutions that use storage servers accessible via File Transfer Protocol (FTP) and other network-based protocols have been used for quite some time for this purpose, as have Web-based file hosting services. More recently, file hosting services that also offer file synchronization across multiple client devices are becoming an increasingly popular way to store computer files. These services allow users to create a special folder on a computer, which the service then synchronizes so that it appears to be the same folder with the same contents regardless of the particular device on which the folder is viewed. Services of this type include Dropbox™, Google™ Drive™, Microsoft™ SkyDrive™, Microsoft SharePoint™ and others. The providers of these services typically offer software for different operating systems such as Microsoft Windows™, Apple™ Mac OSx™, Linux™, Android™, Apple iOS™, Blackberry™ OS™ and web browsers. The popularity of these services is no doubt due to the increasing tendency of each person to use multiple devices such as laptops, desktops, smart phones, tablets, etc. while expecting their information to be available anytime, anywhere.

While these store and sync services have found widespread use and provide many advantages they are not without their shortcomings. One important shortcoming involves security. For example, any user that has been authorized to access another user's Dropbox folder will be granted access to all of the contents of that folder. Therefore, these services provide no easy way to manage security on a per file, or even per-folder, basis. And even if a user tries to make use of passwords to protect individual files, there is still the problem of managing distribution of the password among two or more other people who wish to collaborate on a project.

One solution to provide seamless, secure, private, collaborative file synchronization across trust boundaries was described in U.S. Pat. No. 8,572,757 by Stamos and Odnovorov and assigned to nCrypted Cloud LLC, also incorporated by reference herein. As described in that patent, this is done by storing everything that is needed to recover a protected file within the file itself, without giving away the secret data needed to recover the file, including all information needed to recover the file in the event a password is lost. User-specific personal keys are preferably only stored on the users' device(s). A unique ID is also created for each protected file; a password is generated that depends on (a) a key value that can either be (i) the user's personal key in the case of a file that is to be private or (ii) a shared key in the case of a file that is to be shared with other users, and (b) the unique file ID. The password is then encrypted using a recovery key and also stored in the file itself. The file can be further secured using a format that supports password-based content encryption.

SUMMARY

An additional complexity added to ensuring file security derives from the so-called Bring Your Own Device (BYOD) trend. This is now a common problem in many enterprise environments. Employees use their own computers, tablets, and smart phones while interacting with company's data. The same computer is thus used to store personal information and corporate files. At the same time, companies want to protect the information that the company owns. Also, employees do not want the company to have access to their personal data. When an employment agreement is terminated, the access to the company's data also needs to be conveniently disabled.

A Multi-Identity design as described here aims to solve these and other problems.

In one implementation, the Multi-Identity design is utilized as part of a method for providing controlled, collaborative access to a file system object. A "personal" identity may be associated with file system object such as a data file or folder in which data files are stored. Objects associated with the personal identity are controlled by the user. In addition, the user may assign an organization-related or "work" identity with a file system object originated by an individual user. Access to the data file is then granted to is the file system object based on the user's current status with the organization, rather than completely controlled by the user.

To assist the user with identifying respective file system objects, the user is presented with a corresponding graphical user interface (GUI) which displays a corresponding personal or work identity icon next to a visual rendering of the file system objects.

Access to access to file system objects associated with the personal identity is protected using information that depends on an identity of the user, whereas access to file system objects associated with the work identity is protected using information that depends upon both (a) an identity of the organization associated with the work identity and (b) information relating to a present status of the user with respect to the organization. This protect may be further controlled by revoking access to the file system object by the user when the organization no longer approves of the users' association with the organization, and further preventing the individual from revoking access to the shared data file by the organization subsequent to revoking the individual's access to the shared data file.

Access to a work identity file system object may be further controlled by storing one or more access keys in a local key store on one or more data processing machines operated by the individual user. These access keys are also purged from the local key store when owner identity changes are detected. This ensures that the individual user will not be able to use the access keys to decrypt the data file shared using the organization identity as soon as the individual's authorization is canceled by the organization.

In still other aspects, access to the work-related file system object may be controlled by assigning the organization identity a unique key pair that is then used as a recovery key for files associated with an organization-level identity. Each individual user associated with an organization may also be assigned a unique key pair that is then used as a recovery key for files associated with a work-level identity for that individual user.

Folders containing one or more files to be shared securely are also protected in a particular way. For example, the folder is assigned a folder key, and if the contents of the folder is to be shared with other individual users, that is accomplished by sharing the folder key.

In other aspects, each shared data file may be protected using a unique file password generated from a key associated with a folder in which the file is located and a unique file identifier. The unique file password is then protected using a recovery key associated with the organization related identity, and/or recovery key associated with the individual user, but only so long as the organization authorizes the individual user.

BRIEF DESCRIPTION OF THE DRAWINGS

The description below refers to the accompanying drawings, of which.

DETAILED DESCRIPTION OF AN ILLUSTRATIVE EMBODIMENT

With reference now to the figures, the novel aspects of a system and method for seamless, secure, private collaborative information sharing across trust boundaries will be described where individual users and the files associated with the individual users may have multiple identities, including a Work identity and a Personal Identity. It should be understood that these drawings and the accompanying text illustrate examples only, and are not intended to assert or imply any limitation with regard to the data processing environments in which these techniques may be implemented or how they are implemented. Many modifications to the depicted environments and implementations may be made.

Figure 1:
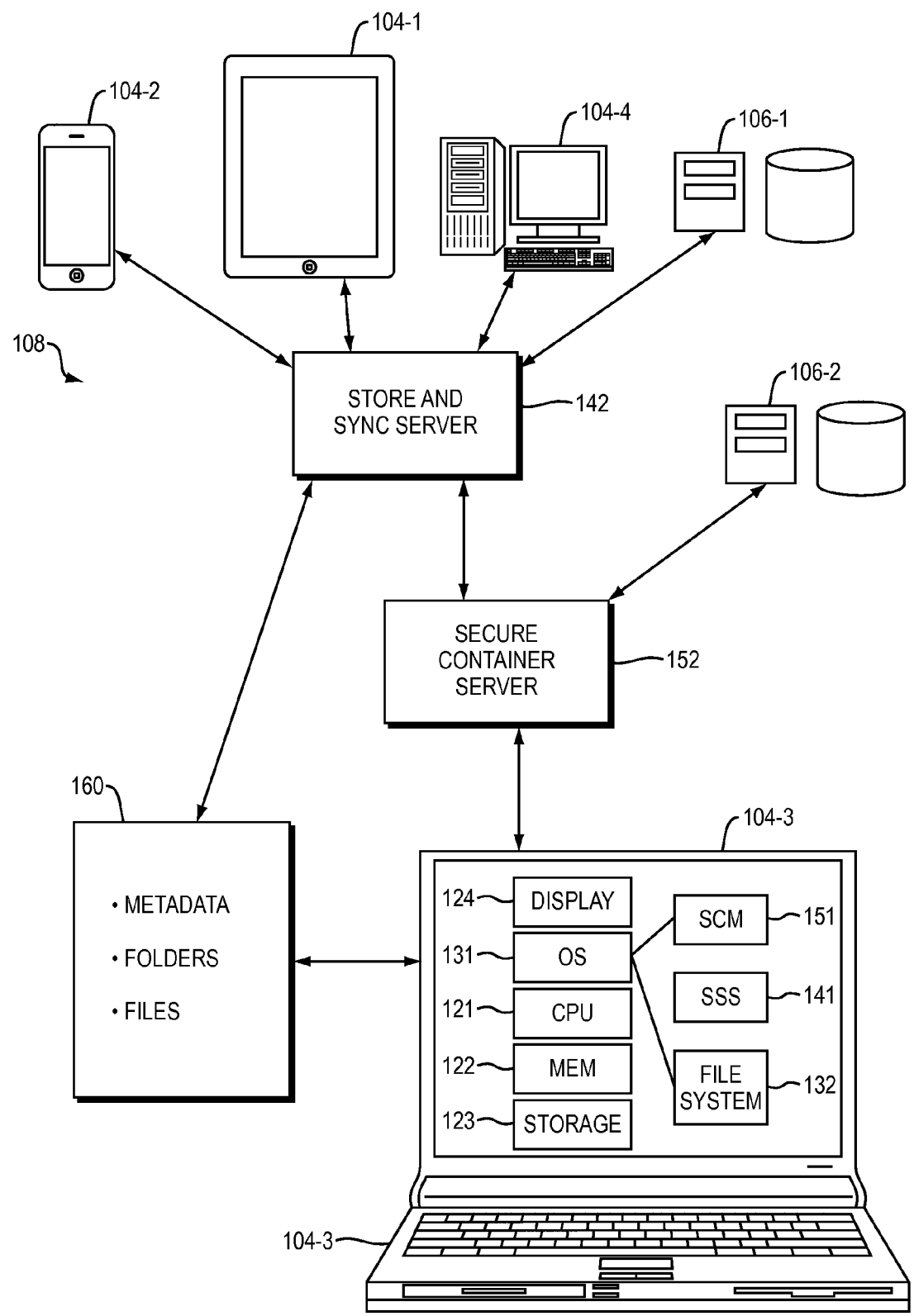
FIG. 1 is a high-level diagram illustrating a network of data processing systems in which preferred embodiments may be implemented.

More particularly, FIG. 1 illustrates a network of data processors that includes client data processing devices, such as tablet 104-1, smart phone 104-2, laptop 104-3, desktop 104-4, and one or more file servers 106-1, 106-2. The data processors are interconnected via one or more networks 108 that provide communication links between the various client devices 104 and servers 106. The communication links may include wired, wireless, fiber optic or other physical link types. It is understood that each of the client devices 104 and servers 106 thus each includes a network interface enabling it to communicate with other data processors connected in the network 108. The network 108 may also use any number of protocols to support these connections; one quite widespread protocol is the Transmission Control Protocol/Internet Protocol (TCP/IP) suite of protocols. The network may include intranet, local area network, wide-area networks and other types of networks. Therefore, the specific illustration of FIG. 1 is intended only as an example and not as an architectural limitation on different embodiments of the network types or data processing hardware.

In the lower right-hand corner of FIG. 1, one of the data processors—specifically laptop 104-3—is shown in more detail as an example client device that a user is presently interacting with. As with most any data processor, laptop 104-3 includes a number of hardware elements such as a central processing unit 121, memory 122, storage 123, and touch sensitive display 124. An operating system 131 executes software to enable the user to perform various functions and run applications. The operating system enables the user to create, edit, delete, and manage data files using a file system 132. A file system 132, as used herein, is any resource for storing information and/or data on a computer. File system 132 can be a part of the operative system 131 or layered on top of it. The file system 132 typically provides both physical and logical methods for organizing the user's data into files. As can be appreciated, data stored in files on a file system are frequently sensitive in nature such that it is desirable to prevent at least some users of the network 100 from being able to access the user's data, while at the same time allowing the user to collaborate and share selected data with other users.

The laptop 104-3 also has access to a file storage service via a client application 141 that enables the laptop 104-3 to access data files that are not stored locally on laptop 104-3 but rather on remote data storage device 106-1. These remotely stored files may be managed by a file access server 142. In some embodiments, the client application 141 may be a remote file access component that is part of the file system 132, layered on top of the file system 132, make system-level calls to the file system 132, or even embedded features of the operating system 131 itself.

Regardless of its implementation, the client application/feature allows the user to access the remote files via server 142. Some example remote server 142 and client/features 141 may use operating system native file access features such as Microsoft SharePoint, or Apple™ AirDrop™, and still others may use File Transfer Protocol (FTP)-based file sharing programs, and the like. In many other cases, the client may be a "store and sync service" client 141 that runs on top of the operating system 131. Such store and sync services include services such as Dropbox, Google Drive, Microsoft Sky Drive or other application-level service that is easily installed and managed by a user with limited computer experience.

These store and sync services enable a user to create a special folder on one or more of their devices such as laptop 104-3. The store and sync client 141 and server 142 components (collectively referred to here as the store and sync service) typically include software-programmed processors that operate to automatically and transparently synchronize the contents 106 of that folder and/or files and/or related metadata across other devices controlled by the user such as tablet 104-1 and smartphone 104-2. This results in the file(s) appearing to be the same folder and/or the same file with the same contents regardless of the device 104-1, 104-2, 104-3 on which it is viewed. Files placed in this folder can also typically be accessed by other users, such as via a desktop 104-4, if the original user has decided to share the file with these other users.

It should be understood that although FIG. 1 shows a store and sync server (SSS) client 141 and store and sync server 142 with background, transparent file synchronization features, the transparent file synchronization features provided by these services are not critical to specific embodiments described here. What is important is that the users are given the ability to share files collaboratively with other users.

Of particular interest here is that the user has installed an additional application 151 that provides access to a Secure Container Management (SCM) service. The SCM service also has a component operating in the network such as server side component 152 on a still further server 106-2. The SCM client 151 and SCM server 152 components typically include software-programmed processors that (collectively referred to here as the SCM service), and cooperate to further operate on the files and folders that the user creates using the store and sync service; or acts as a proxy to access other types of file storage services as may be supported.

It should be understood that the SCM related components 151, 152 can be installed and can operate separately from the store and sync components 141, 142 or may be an integral part of the store and sync components 141,142.

Figure 2:
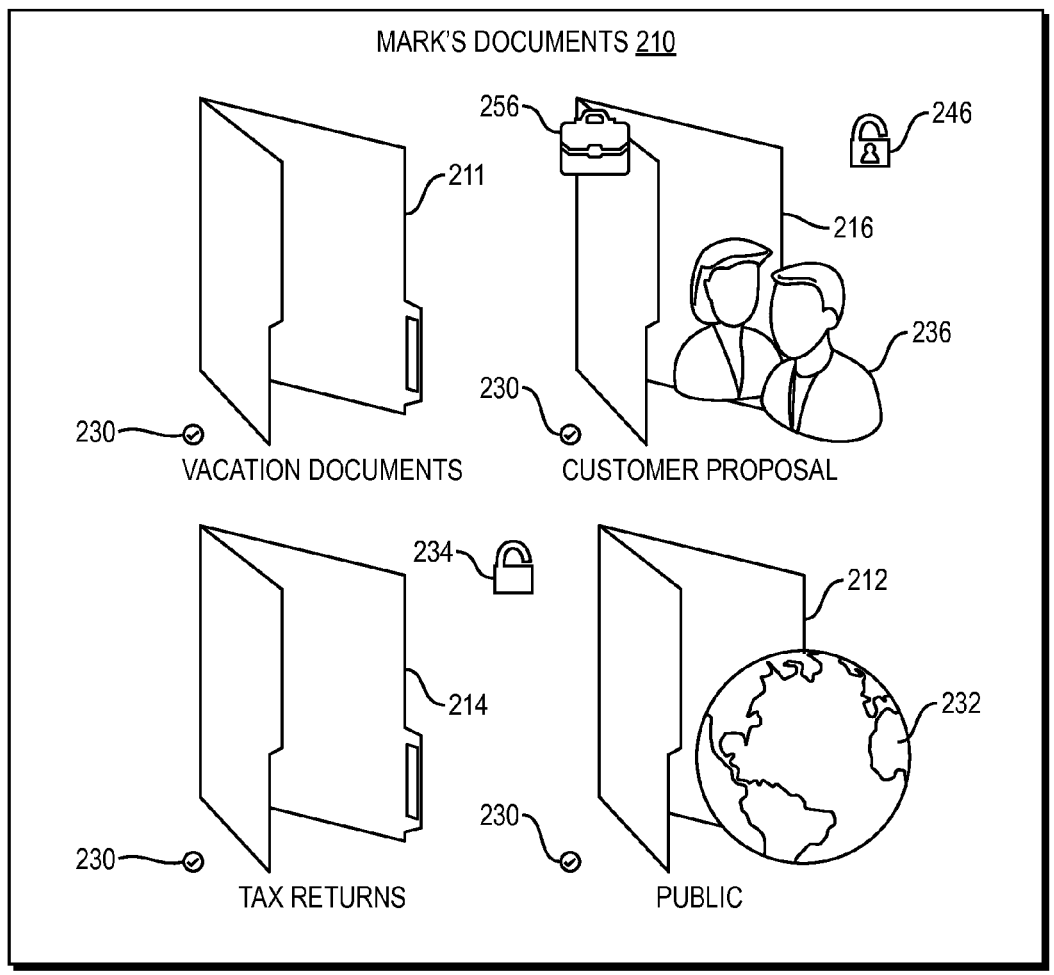
FIGS. 2, 3A and 3B illustrate a user's view of the contents of a file folder from within the secure container management application.

FIG. 2 illustrates a view of a folder that the user of laptop 104-3 (or any of the other client devices 104-1, 104-2, . . . , 104-4) may see with the SCM client application 151 active. The view is an "icon-type" of the contents of a high-level folder 210 labeled "Mark's Documents" that includes four sub-folders illustrated with native file system folder icons—a private unsecure folder named "Vacation Documents" 211, a shared sub-folder 212 named "Public", a private secured folder 214 named "Tax Returns", and a secure, shared sub-folder 216 named "Customer Proposal".

Small icons next to the native file system folder icons illustrate additional information. For example, a smaller checkbox icon 230 is added by the store and sync service 141, 142 to indicate that the contents of a folder have been synchronized among the user's devices. For example, the user of laptop 104-3 may also be an authorized user of tablet 104-1 and smartphone 104-2, and the checkmark icon 230 indicates that the folder(s) are currently synchronized among this user's three devices.

The sub-folder "Public" is similarly illustrated with a native file system folder icon 221 and an adjacent globe icon 232 indicating that this folder is being shared publicly such that any other users of the store and sync service may access it.

A third sub-folder 214 labelled "Tax Returns" has a lock icon 234. That file has been made private by the user selecting appropriate actions through the SCM service 151, 152. The "private, secure" status of this folder is indicated by the lock icon 234.

A fourth item shown is the sub-folder 214 "Customer Proposal". This folder has been synchronized by the store and sync service as indicated by small icon 231 and is also being shared collaboratively as indicated by the share icon 236. A third small icon 246 indicates that this file has been securely stored by the SCM service. This folder contains sensitive information (such as documents relating to a sales proposal being prepared by the Organization where the user Works) The user wishes to securely share the contents of this folder with other people at his place of work. However, the user does not wish to share the contents of this folder with anyone else who is not associated with his Work, and the user, as well as the Organization associated with his work identity, wish to have added security applied to the contents of this folder. As explained in further detail below, the user has enabled this feature for this particular folder 231 such as by the user previously interacting with a menu.

It should be understood that the SCM view shown in FIG. 2 is an artifact of the operation of the SCM client 151 and SCM server 152 and in no way interferes with the operation of the store and sync service 141,142 or other underlying file storage service.

In addition, the SCM client 151 preferably ensures that artifacts of the file and folder structure(s) needed to securely share the contents of folders are hidden from the user. All of the information needed to maintain the shared securely features associated with the SCM view of FIG. 2 can be stored within the secured file itself. For example, when a new user first accesses the SCM service, he is asked for a username and password. This information is then used to generate a key pair which is then stored locally on the user's device. In general, precautions are taken so that this key is never stored on a server, but can be generated on any machine on which it is needed.

One approach to implementing securely shared features was described in the above-referenced U.S. Pat. No. 8,752, 757. However, in the implementation shown in FIG. 2, a further extension is provided where a user may have multiple identities. An identity can be one of the following example types:
Personal
Work A user creates an identity by associating an e-mail address with his SCM service account. Folders are then shared securely using the selected identity, (either Personal or Work) in a manner described in greater detail below.

User Interface Elements

The SCM client 151 software preferably uses visual clues to help differentiate the type of identities used to share a particular folder.

For instance, in the sample folder view of FIG. 2, a shared folder 216 called "Customer Proposal" is marked by the user interface with a briefcase overlay icon 256, identifying a Work identity for that folder.

Figure 3A:
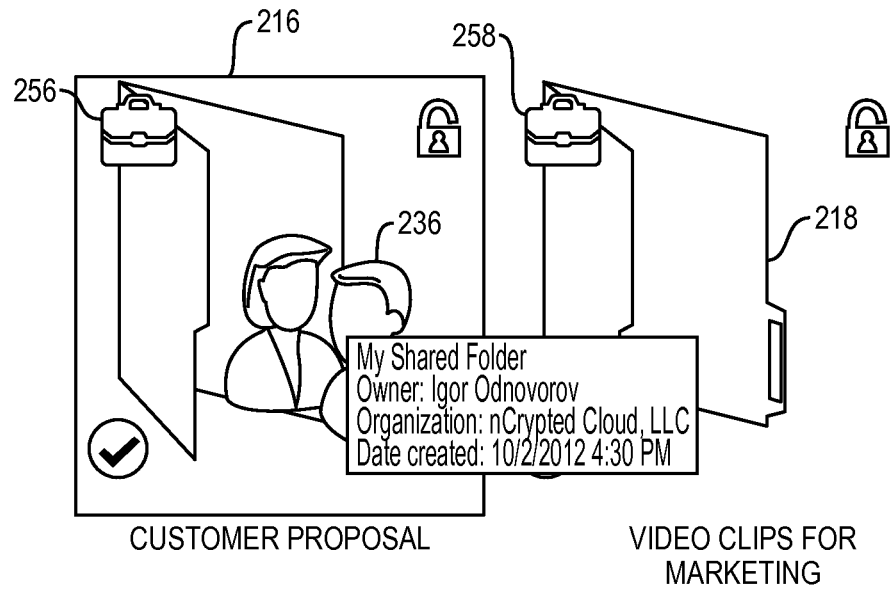

Also, as shown in sample view of FIG. 3A, a tooltip shows the folder owner information ("Igor Odnovorov") for shared folder 216 and that an Organization that the owner of that folder with a Work identity belongs to (e.g., "nCrypted Cloud LLC"). Note also that another folder 218 named "Video Clips for Marketing" also has a Work identity indicated by the adjacent briefcase icon 218; however folder 218 is not being shared with others, as indicated by the lack of a share icon 236.

Figure 3B:
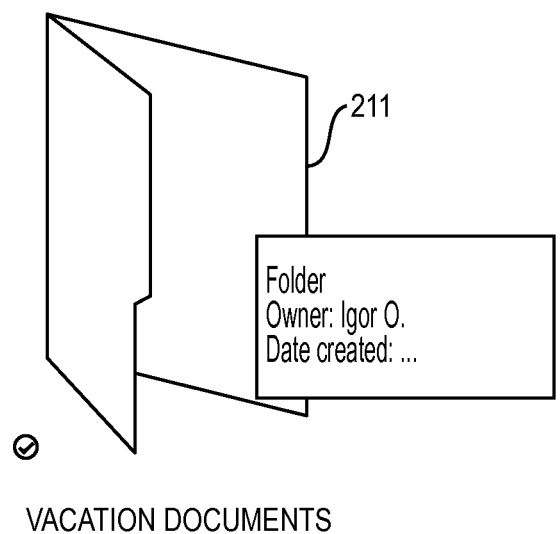

The sample of FIG. 3B shows a folder 211 and the associated tooltip that indicates the folder owner is a user named "Igor O.". This folder is a Personal folder, as indicated by the lack of any briefcase icon. This folder is not being shared, but it can be and if it were, it would also have a share icon like icon 236.

Figure 4:
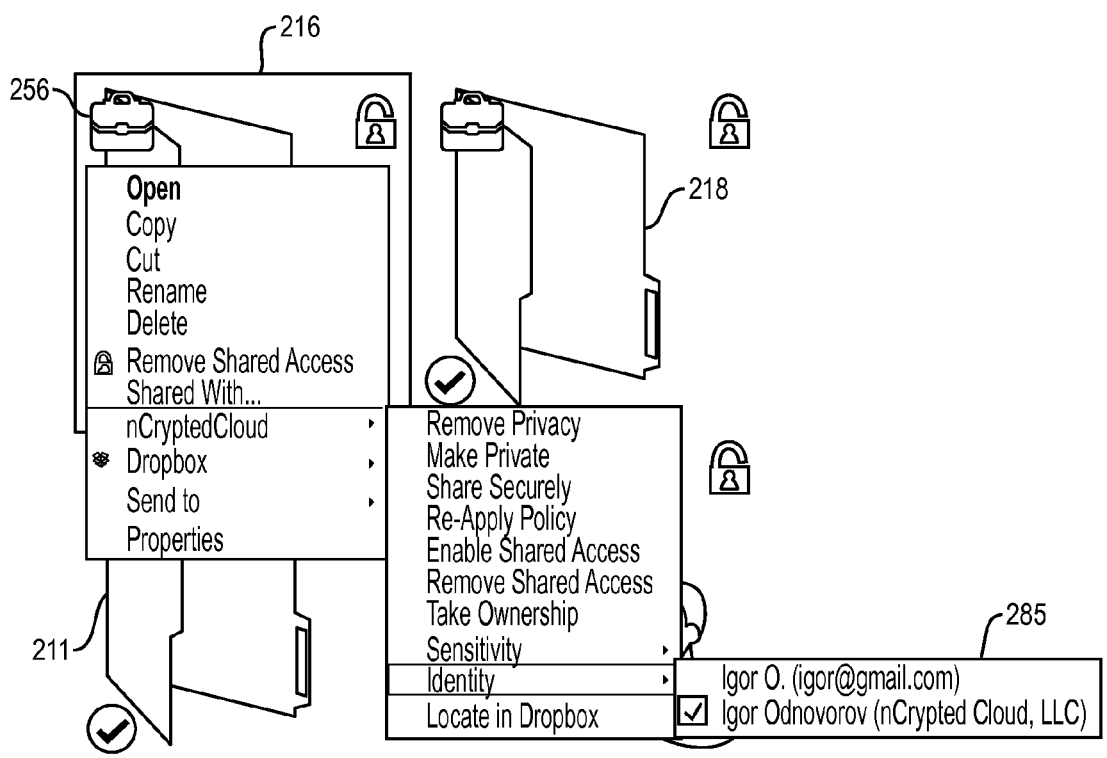
FIG. 4 shows a context menu that enables a user to view the identity assigned to a folder.

A user can select which identity is to be applied to a folder. This selection can be done via a folder share context menu, as shown in FIG. 4. The context menu 280 may be activated such as via a right-button mouse click. The menu indicates a number of options for the folder—whether it is to be secured (made private), and importantly, which identity to apply, as indicated by available Personal (Igor O.) or Work (Igor Odnonorov) owner options list 285.

Figure 5:
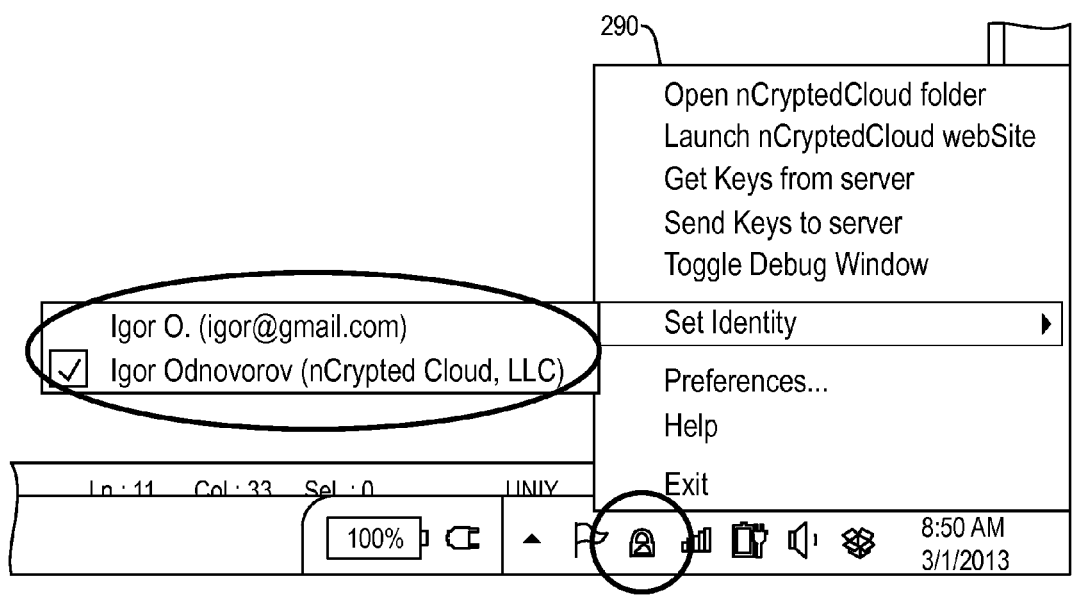
FIG. 5 shows a context menu where a user may set a current identity.

The user can also set a current identity. The current identity settings may be persisted in a user configuration file. If a current identity is set, it is accessed and used every time a folder is shared securely. The current user identity can be set using a client side context menu 290 as shown in FIG. 5.

Establishing Identities

When a service account is first established, the user selects the type of identity to be associated with that service account. A personal identity does not require any further approval (except perhaps via e-mail reply verification). A user may register multiple personal e-mail addresses (Yahoo, Hotmail, Gmail etc.) and associate them with the same account.

The SCM service 151,152 operates differently if the user assigns the Work type to his identity. Work identities need to be associated with an Organization. Organizations are created through the SCM service 151,152 by certain authorized users associated with the Organization. Having an Organization identity types help define data containment policies at the Organization level. When an Organization entity is created a pair of recovery keys (one public, one private) are generated and associated with the Organization.

The assignment of a Work type to an account identity may or may not require further approval and/or verification. This further verification can be done in a number of ways. The requested account identity may have to indicate an email address with a certain domain name portion (e.g., the user requesting a Work identity may have to specify a particular ".com" or ".org" email address authorized by the Organization) which is then verified via email exchange. However, other validation schema can be used, such as manual verification by individuals authorized by the Organization, or third party email address verification services.

The scan server can also take steps to ensure that an email address associated with an Organization is not used to create a Personal identity, and that a personal email address (Gmail, Yahoo, etc.) is not user to create a Work identity.

Recovery Keys and Management

As explained above, Personal identities may be associated with an SCM service account. Each account has a pair of recovery keys, the pair including a public recovery key and a private recovery key. The account's public recovery key is used to protect the data in folders, shared using the Personal identity, such as in the manner described in the referenced U.S. Pat. No. 8,572,757. The owner of a folder, shared using a Personal identity can always recover the files using the private portion of the recovery key.

As mentioned above, a Work identity may also be associated with an SCM service account. The associated Organization's public recovery key is used to protect the data in folders that are shared using the Work type of identity. The Organization always can recover files using the private portion of the recovery key. Each Work identity also receives a pair of recovery keys, associated with the particular Work identity. The public portion of the work identity's recovery key is used to also protect the files in a folder shared using a Work identity. The Work identity's recovery keys are distributed to the identity's owner by the SCM service as long as he belongs to the Organization. So, all the files shared by a Work identity can be decrypted by the identity's owner (as long as he belongs to the Organization). Once the user is no longer associated with the Organization, the Work identity recovery keys are no longer distributed to him by the SCM server 152, and the associated portions of the local key store on the user's devices 104-1, 104-4 are purged.

When an Organization data record is first created, the scan server therefore creates a key pair for the Organization to use. In one embodiment, the Organization is asked to generate their own key pair, and only share the public key portion with the scan service. This eliminates the need for the scan service 152 to have access to an Organization's private keys.

Of course a given user may have more than two assigned identities, to support multiple Work identities for multiple Organizations with whom the user is associated, etc.

Figure 6:
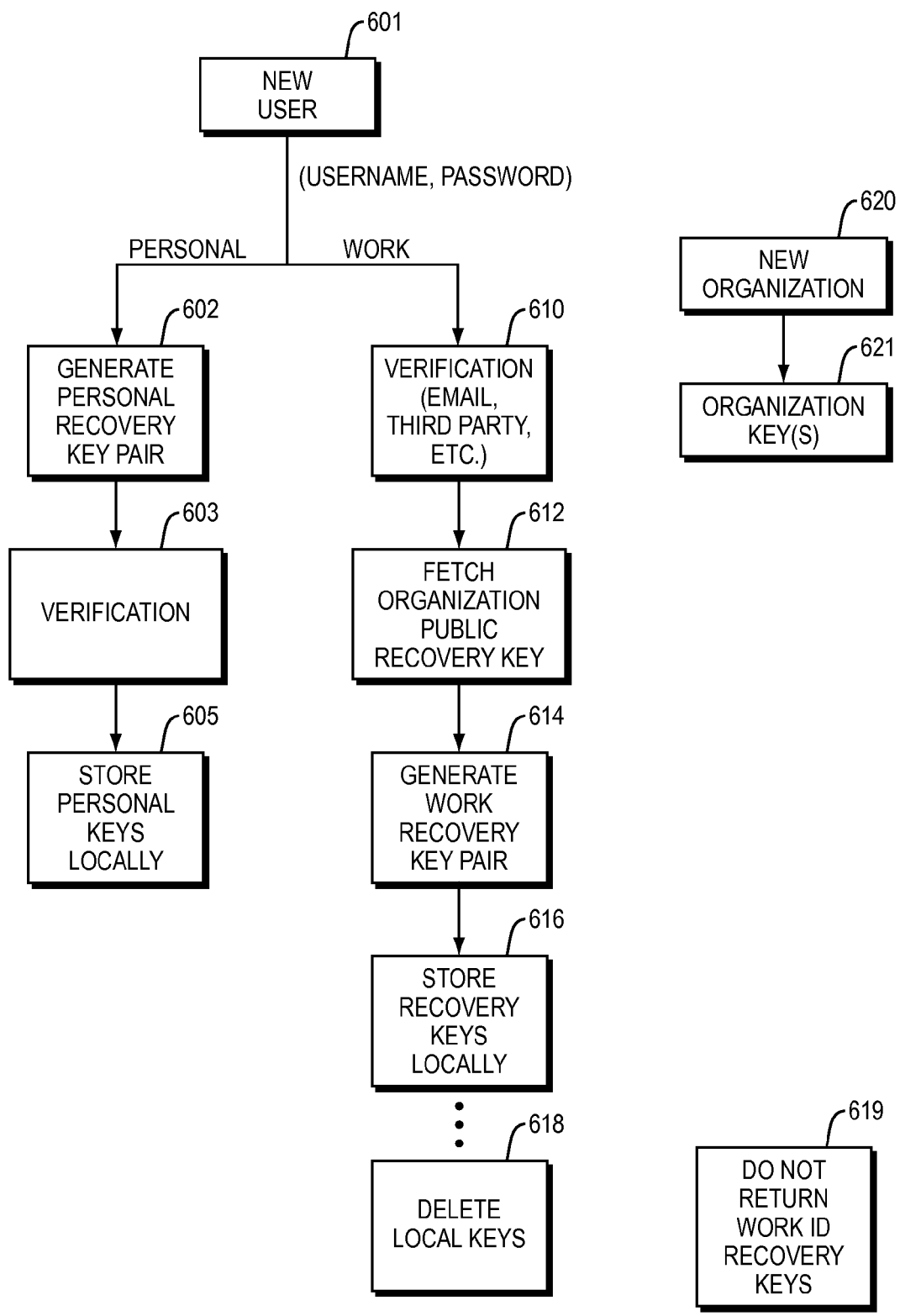
FIG. 6 is a sequence of steps performed to generate recovery keys for a Personal or Work identity.

The process flow of FIG. 6 illustrates this. When a new user service account is established in state 601, a user name and password are obtained. The user is asked if the new service account is to be a Personal or Work type identity. In an instance where it is a Personal identity, step 602 is taken to generate a Personal recovery key pair. AN optional step 603 is taken to verify the new user's identity such as via email. The Personal recovery key pair is then stored locally in step 605. This recover key process is therefore same as in the referenced U.S. Pat. No. 8,572,757.

However in an instance where a new Work identity is to be created a state 610 is entered. Here the email address specified for this new Work identity is verified either via an exchange of emails the third-party service in the manners described above. In state 612 the Organization key(s) are then obtained, at least the Organization's public key. This will later provide the organization with an ability to recover shared files when an individual user's recovery keys are revoked. These Organization keys may be previously generated. For example, in state 620 when a new organization is first created, the Organization's keys at least the public key are obtained and stored for further reference in state 621.

In state 614 a Work recovery key pair is generated for the new user and associated with the Work identity. This information is stored locally along with the public Organization keys. At a later time when the user's work identity is to be revoked, the Work recovery keys can be deleted from the local store in state 618. In this event, the server 152 can also enter a state 619 where it stops returning the Work recovery key pair if subsequently requested.

Resulting Access Depends on Personal or Work Identity

When a folder is shared using a Personal identity, the owner of the folder has complete ownership of the data. As in the referenced U.S. Pat. No. 8,572,757, the owner's recovery key (which in the case will be the Personal keys generated in state 604) is used to create the recovery record for every file stored in the folder. When an owner decides to stop sharing the information, the shared key is deleted and only the owner can decrypt the data using private portion of his recovery key.

The situation is different in case of files and folders associated with Work identities. Organizations want to make sure they have access to the data when employees leave the company. Also, Organizations do not want former employees to have access to the company's files.

To address this issue, the SCM service uses the Organization's recovery key while creating the recovery record for every file, stored in a folder, protected using a Work identity. The user who shares a folder securely is still considered the folder's owner as long as he is part of the same Organization. The scan service retrieves user's identities from the SCM server 152 and validates user membership to the Organization. The keys are purged from a local key store as soon as identity changes are detected. In other words, even a folder owner will not be able to decrypt files stored in a folder shared using a Work identity, as soon as that user's identity is canceled by the Organization.

Figure 7:
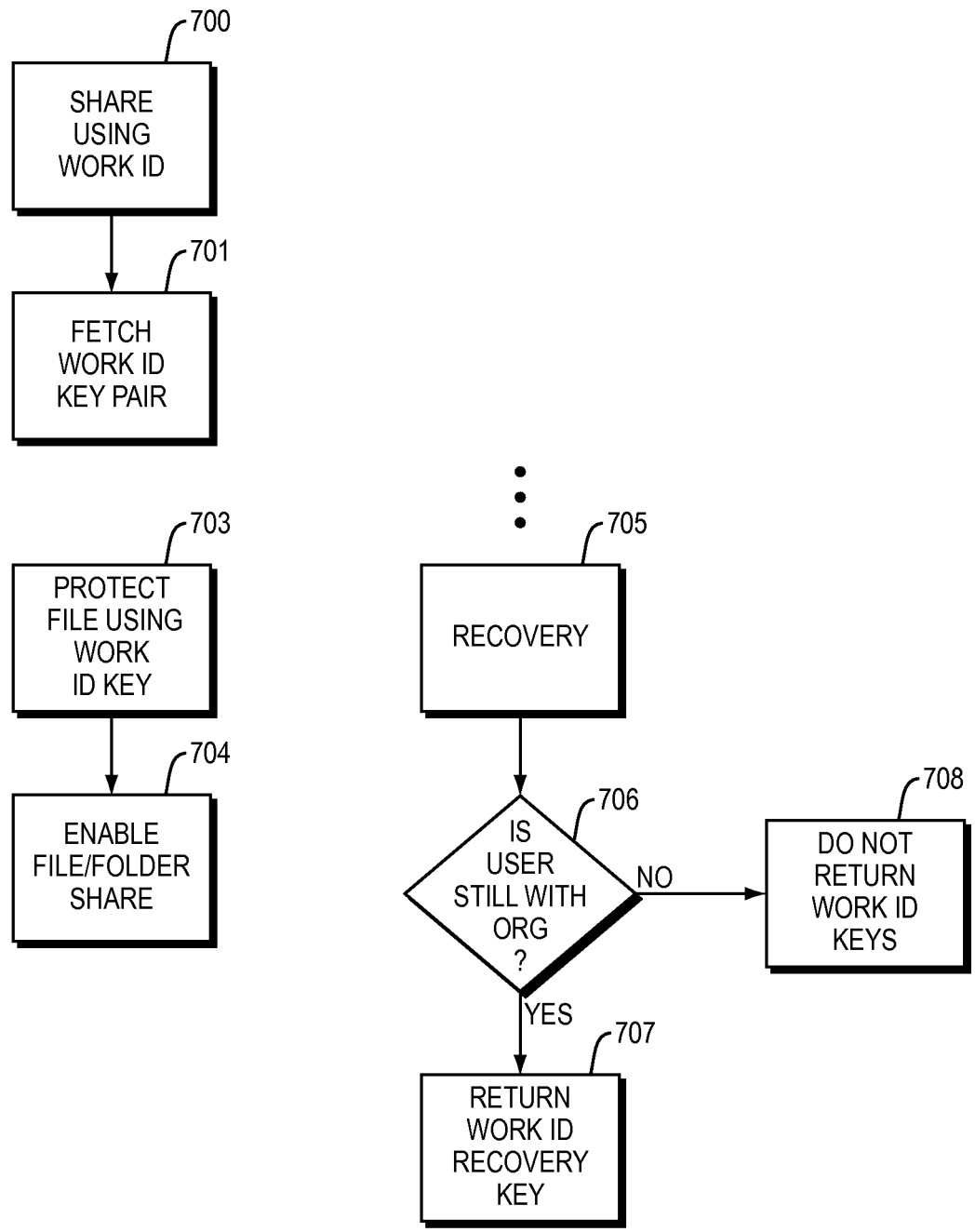
FIG. 7 illustrates a sequence of steps used to protect a file or folder using a Work identity.

FIG. 7 shows this process as a workflow for Work identities. When a user requests to share a folder using a Personal identity, the user is given exclusive and complete ownership of the data, and management of the files, including protecting folders and/or files then proceeds as per the U.S. Pat. No. 8,572,757. However the situation is different in the case of Work identities. To allow an Organization to make sure they have access to the data when the employees leave the company as well as at the same time preventing former employees from having access to the company files, the SCM service 152 enters a state 700. Here a file and/or folder are to be shared using the Work identity. In state 701 the associated Organization's public recovery key is used to protect the data in the files or folders that are to be shared using the Work identity. In this way the Organization can always recover files using the private portion of the recovery key.

However as explained above, each Work identity also receives a second pair of recovery keys associated with that Work identity. Thus in state 702 the public portion of this Work key is retrieved and then used to protect the file such as by encrypting a password for it sing the Work identity key(s) in state 703. The Work identity recovery keys are also distributed to the identity owner by the SCM service 152 when requested. For example a state 705 can reach a state 707 and return the Work recovery keys when they are returned to the user's SCM application so long as step 705 indicates that the user continues to belong to the organization. Once the user no longer belongs the organization, the Work recovery keys are not distributed in state 708.

Identity Data Format

In one implementation, the SCM service 152 receives set(s) of identity data serialized using a JSON format. The identities are imported into a local key store on each user's machine. Below is a sample set of Personal, Work and Organization identities returned by the SCM server 152:

```
{
    "identities":
    [
        {
            "id": "{5446A368-08C6-44FB-831C-6AE33CFF2CA5}"
            "account-name": "igor@gmail.com"
            "name": "igor@gmail.com"
            "friendly-name": "Igor O."
            "recovery-key-id":
            "{F0BF57FC-595D-4ABE-8C23-9F80991CB8C4}"
        },
        {
            "id": "{6ECC7C9F-6774-4860-A4F5-C3340D7517E8}"
            "account-name": "igor@ncryptedcloud.com"
            "name": "igor@ncryptedcloud.com"
            "friendly-name": "Igor Odnovorov"
```

-continued

```
            "organization-identity-id":
            "{A9DCD4F2-0D2A-4F3A-B455-0538B1FCA79E}"
        },
        {
            "id": "{A9DCD4F2-0D2A-4F3A-B455-0538B1FCA79E}"
            "name": "access_manager@ncryptedcloud.com"
            "friendly-name": "nCrypted Cloud, LLC"
            "recovery-key-id":
            "{F0BF57FC-595D-4ABE-8C23-9F80991CB8C4}"
        }
    ]
}
```

Collaborate File Sharing Among Organizations

It can now be understood that a given user may wish to share files with other users associated with other organizations using the respective Work identities. Because the SCM server 152 performs the vetting necessary to ensure that each user is verified as properly belonging to their respective Organization, trusted file sharing is thus also possible among different Organizations that use the SCM server 152. Thus, a first user associated with a first Organization and a second user associated with a second Organization may rely upon the SCM server to that verify each of the respective users are who they say they are. This then provides a feature operating somewhat like a federated certificate sever, permitting the organizations to use the SCM server to provide secure file sharing across trust boundaries.

What is claimed is:

1. A system associated with a user, comprising:
one or more network interfaces adapted to communicate data over a computer network;
a hardware processor coupled to the network interfaces and adapted to execute one or more processes; and
a memory configured to store a process executable by the hardware processor, the process when executed operable to:
display a file system object icon representation of a file system object, the file system object including at least one file or at least one folder originally created by the user,
determine whether user input is received to associate a personal identity or a work identity to the file system object,
in response to receiving a user input selection to associate the personal identity to the file system object, display a personal identity icon adjacent the file system object icon,
in response to receiving a user input selection to associate the work identity to the file system object, display a work identity icon adjacent the file system object icon,
protect access to file system objects associated with the personal identity using information that depends on an identity of the user,
protect access to file system objects associated with the work identity using information that depends upon an identity of an organization associated with the work identity and information relating to a present status of the user with respect to the organization, by further:
revoke access to the file system object by the user when the organization no longer approves of the users' association with the organization, and
prevent the individual from revoking access to the shared data file by the organization subsequent to revoking the individual's access to the shared data file, even when the file system object was originally created by the user.

2. The system according to claim 1 wherein the process is further executable to:
protect access to the file system object when the work identity is associated with the file system object using a password that depends on both (a) a an organization key shared among the user and at least one other user associated with the organization, and (b) an identifier of the file system object,
storing the password within the file system object, and
revoking access to the organization key by the user when the organization no longer approves of the user's association with the organization.

3. The system according to claim 1 wherein the file system object is associated with a cloud storage application.

4. The system according to claim 1, wherein in further response to receiving a user input selection to share the file system object with at least one other user, the process is further configured to:
display a share icon adjacent the file system object icon.

5. The system according to claim 1, wherein the process is further executable to: protect access to the file system object associated with a work identity by further to
generate an organization recovery key associated with the organization,
protect the password with the organization recovery key, and
preventing access by the user to the organization recovery key when the organization no longer approves of the user's association with the organization.

6. The system according to claim 1 wherein the process is further executable to:
assign ownership privileges to the file system object, wherein the user is granted ownership privileges to the file system object as long as the user's association with the organization is approved by the organization, but when the organization revokes such association, the user is no longer granted ownership privileges and ownership privileges are instead granted to the organization.

7. The system according to claim 6 wherein ownership privileges to the file system object are controlled by a collaborative file sharing service that provides cloud storage service for the file system object.

8. The system according to claim 2 further configured to:
purge the organization key from a local key store when the user's association with the organization is revoked by the organization.

* * * * *